United States Patent [19]
Wood

[11] Patent Number: 4,669,810
[45] Date of Patent: * Jun. 2, 1987

[54] HEAD UP DISPLAY SYSTEM

[75] Inventor: Robert B. Wood, Hillsboro, Oreg.

[73] Assignee: Flight Dynamics, Inc., Portland, Oreg.

[*] Notice: The portion of the term of this patent subsequent to Apr. 15, 2003 has been disclaimed.

[21] Appl. No.: 576,724

[22] Filed: Feb. 3, 1984

[51] Int. Cl.⁴ .......................... G02B 5/32; G02B 27/14
[52] U.S. Cl. ...................... 350/3.7; 350/372; 350/174
[58] Field of Search ............ 350/174, 3.7, 3.72, 350/3.73, 3.75, 3.82, 3.85, 3.86

[56] References Cited

U.S. PATENT DOCUMENTS

| | | | |
|---|---|---|---|
| 3,940,204 | 2/1976 | Withrington | 350/3.72 |
| 4,218,111 | 8/1980 | Withrington et al. | 350/3.72 |
| 4,245,882 | 1/1981 | Chang | 350/3.72 |
| 4,261,647 | 4/1981 | Ellis | 350/174 |
| 4,407,564 | 10/1983 | Ellis | 350/174 |
| 4,412,719 | 11/1983 | Fienup | 350/3.7 |
| 4,447,128 | 5/1984 | Ferrer | 350/174 |
| 4,456,328 | 6/1984 | Arns et al. | 350/3.6 |
| 4,458,977 | 7/1984 | Arns et al. | 350/3.6 |
| 4,458,978 | 7/1984 | Arns et al. | 350/3.67 |
| 4,497,534 | 2/1985 | Sincetbox | 350/3.72 |
| 4,530,564 | 7/1985 | Close | 350/3.69 |
| 4,582,389 | 4/1986 | Wood et al. | 350/174 |

OTHER PUBLICATIONS

Swift, D. W. et al., "Diffractive Optics for Avionic Displays, AGARD Conference on Advanced Auionics and the Military Aircraft Man-Machine Interface, *Proceedings*, No. 329, Feb. 1982, pp. 31-1-31-8.
D. H. Close, "Optically Recorded Holographic Optical Elements," *Handbook of Optical Holography*, 1979, pp. 573-585.
D. H. Close, "Holographic Optical Elements," *Optical Engineering*, vol. 14, No. 5, Sep.-Oct. 1975, pp. 408-419.
R. C. Fairchild and J. R. Fienup, "Computer-Originated Hologram Lenses," *SPIE Recent Advances in Holography*, vol. 215, 1980, pp. 2-14.
Chungte W. Chen, "Using a Conventional Optical Design Program to Design Holographic Optical Elements," *SPIE Recent Advances in Holography*, vol. 215, 1980, pp. 15-23.
B. J. Chang, "Dichromated Gelatin Holograms and Their Applications," *Optical Engineering*, vol. 19, No. 5, Sep./Oct. 1980, pp. 642-648.
W. S. Colburn and B. J. Chang, "Holographic Combiners for Head-up Displays," Final Technical Report, AFAL-TR-77-110, ERIM No. 122400-9-F, Environmental Research Institute of Michigan, 1977, pp. 1-37 and 75-104.
S. Rao and S. V. Pappu, "Holographic Methods for the Fabrication of Various Types of Mirrors," *Rev. Sci. Instrum.*, vol. 51, No. 6, Jun. 1980, pp. 809-813.
Kenneth C. Johnson and Gaylord E. Moss, "Laser Eye Protection," Final Technical Report for Aug. 1977 to Jun. 1979, N62269-77-R-0307, Hughes Aircraft Co., pp. i-vi and 1-1-4-6.
Daniel J. Coleman and Jose Magarinos, "Controlled Shifting of the Spectral Response of Reflection Holograms," *Applied Optics*, vol. 20, No. 15, Aug. 1, 1981, pp. 2600-2601.

*Primary Examiner*—Bruce Y. Arnold
*Attorney, Agent, or Firm*—Stoel, Rives, Boley, Fraser & Wyse

[57] ABSTRACT

A head up display includes a simplified holographic combiner which has a low surface spatial frequency for avoiding flare. Symbology generated by a cathode-ray tube is focused by relay optics and then reflected by a holographic optical element toward the holographic combiner. The last mentioned holographic optical element is provided with optical power in part compensating for distortions attributable to the large off-axis angle at which the holographic combiner is operated.

11 Claims, 4 Drawing Figures

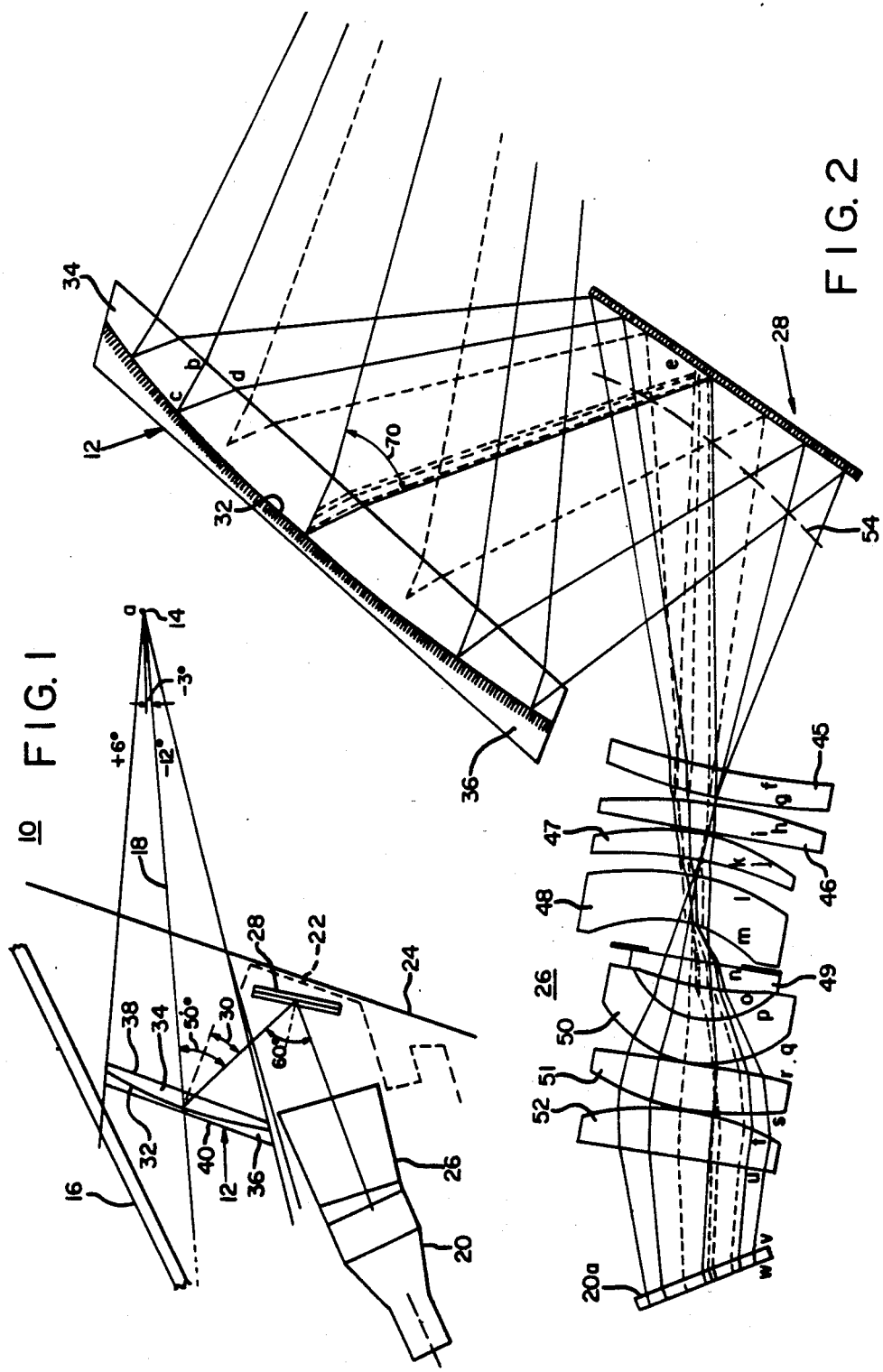

HEAD UP DISPLAY SYSTEM

BACKGROUND OF THE INVENTION

The present invention relates to head up display systems and in particular to a head up display system wherein flare or multiple images are minimized and a substantially aberration-free display is presented.

A head up display for an aircraft conventionally includes a "combiner" through which the aircraft pilot views the outside world and through which the pilot can also view instrument information or symbology useful in flying the aircraft. Thus, the pilot need not lower or refocus his eyes to see certain instrument readings but can view the exterior scene while vital instrument information is projected in his line of sight. Several types of head up displays are well known including conventional systems using a half-silvered mirror or dielectric reflector combiner through which the pilot looks and upon which symbology is projected for viewing. Unfortunately, this type of head up display is very inefficient and tends to reduce visibility of the outside scene. Also the symbology may be obscured by bright exterior light, and the field of view is restricted.

A more satisfactory head up display employs a holographic optical element as a combiner. This type of combiner has advantages of excellent light transmission of the exterior scene and wavelength selective reflection of symbology projected thereupon. As a result, the exterior view is not obscured and the symbology presented upon the combiner is bright and easily seen even under high ambient light conditions. A disadvantage characteristic of holographic head up display relates to "flare" or multiple imaging. Thus, if a bright outside source is viewed through the combiner, such as runaway lights at night, the appearance of flare or an undesired brightness around the object is perceived. If a bright extended object is viewed, multiple images appear around the bright object.

In the copending application of Robert B. Wood and Robert F. Cannata Ser. No. 349,924, filed Feb. 18, 1982, for "HOLOGRAPHIC DEVICE", a flare-free system is described wherein a holographic element used in a combiner has a low surface spatial frequency, i.e. with few fringes intersecting the hologram surfaces. The undesirable effect of these fringes is thereby substantially eliminated resulting in essentially a flare-free system. The term "flare" in the present application is used to describe the spectral and spatial dispersions of real world objects seen through a combiner caused by the undesired transmission grating behavior of a reflecton holographic element having a surface spatial frequency, e.g. when fringes intersect the hologram surface. The surface spatial frequency is reduced by controlling the angular relationship of the exposure rays when forming the hologram, and in a particular case by maintaining the exposure beam from a point source substantially perpendicular to the surfaces of the gelatin or other sensitized material used in constructing the hologram. The holographic combiner formed in the above manner is highly advantageous, but is somewhat restricted in optical power.

In conventional holographic head up displays, a "relay lens" system is used to project the desired symbology toward the holographic combiner at an angle relative to the combiner, with the relay lens system being provided with aberration correction features compensating for the aberrations resulting from the off-axis projection angle. At small or moderate off-axis angles, conventional relay optics are capable of providing a preaberrated image, which, when viewed directly through the combiner, will appear to be in correct proportion. However, at large off-axis angles in a wide field of view system it is difficult to compensate for the aberrations produced by the combiner without also providing aberration correction optical features in the combiner itself. A large off-axis angle results when the holographic projection system is located largely below the windscreen and under the instrument panel in crowded aircraft cockpit constructions. And even though aberration correction power can be built into the combiner as in the prior art, the combiner is then no longer flare-free.

SUMMARY OF THE INVENTION

In accordance with the present invention in a particular embodiment thereof, a first holographic optical element functions as a flare-free combiner through which an aircraft pilot observes the outside scene. Symbology from a cathode-ray-tube source is projected by a relay lens to an intermediate image which is reflected by a second holographic optical element, located out of the pilot's line of sight, toward the first holographic optical element or combiner at a comparatively large off-axis angle. The first holographic optical element further images such intermediate image at infinity and is viewed by the pilot in conjunction with the exterior scene.

The first holographic optical element has a low surface spatial frequency to avoid flare, while the second holographic optical element is provided with aberration correcting power compensating for the large off-axis angle in conjunction with the optical properties of the relay lens. This optical power does not result in flare since the pilot does not look through the second holographic optical element. As a result, a flare-free head up display is provided which is also substantially aberration free.

It is therefore an object of the present invention to provide an improved wide-field-of-view, flare-free, head up display for an aircraft or other vehicles.

It is another object of the present invention to provide an improved, wide-field-of-view head up display incorporating the advantages of freedom from flare and freedom from aberrations, despite a large off-axis projection angle.

It is a further object of the present invention to provide an improved head up display for an aircraft having limited space, requiring the mounting of equipment beneath the windscreen.

The subject matter which I now regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a head up display in accordance with the present invention, FIG. 2 is a detailed side view of the optics employed in the FIG. 1 system, FIG. 3 is a top view of the optics shown in FIG. 2, and FIG. 4 illustrates one method of forming a holographic optical element according to the present invention.

DETAILED DESCRIPTION

Figure 3:
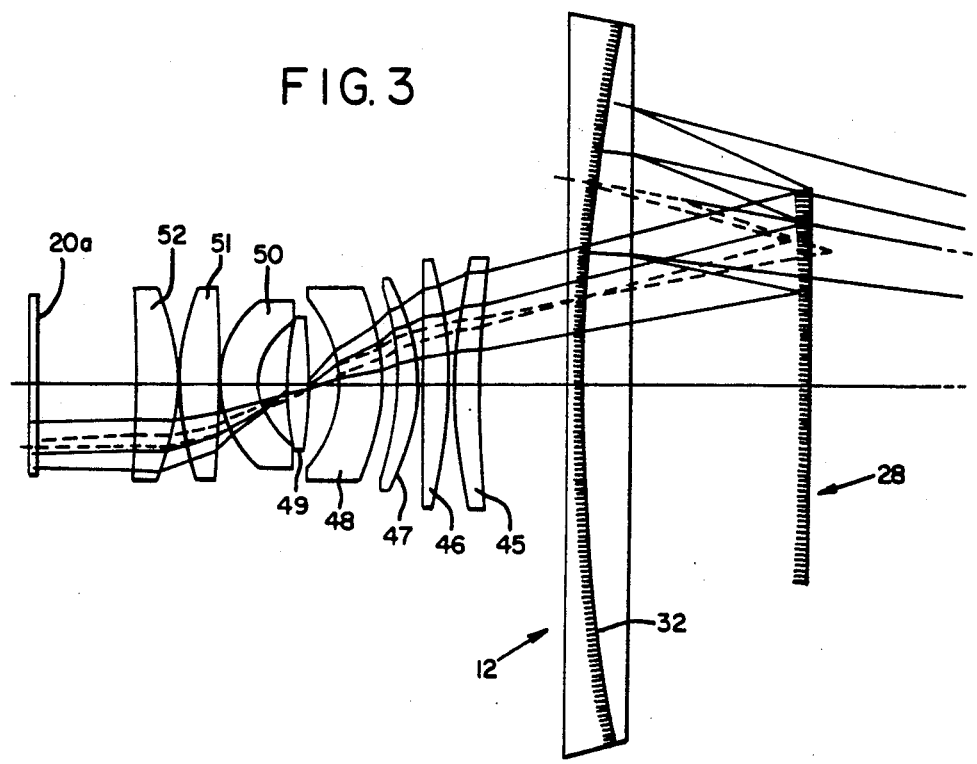

Referring to FIG. 1 illustrating a head up display 10 in accordance with the present invention, a first holographic optical element or combiner 12 is positioned between the pilot's eye position 14 and the aircraft windscreen 16 so that the pilot's line of sight 18 extends to the outside scene through the combiner. An information source in the form of a cathode-ray-tube 20 is located beneath the windscreen and beneath the pilot's line of sight and forward (toward the front of the aircraft) of an instrument panel, generally indicated at 22, which is forward of an ejection clearance line 24. This positioning tends to result in a large off-axis projection angle which produces optical aberrations, particularly when a large pupil and large field of view are desired. Relay optics 26 project graphic information or symbology from the screen of the cathode-ray-tube toward the combiner 12 by way of a reflecting element 28 which, according to the present invention, desirably comprises a second holographic optical element. Element 28 is designed to contribute toward correction of the aberrations produced by holographic combiner 12 as a result of the large off-axis angle 30 at which light from the cathode-ray-tube is projected toward combiner 12. Holographic optical element 28 is, however, located out of the pilot's direct line of sight indicated by line 18.

Also in accordance with the present invention the combiner 12 comprises a hologram or holographic optical element 32 sandwiched between two glass substrates 34 and 36 as described in the aforementioned patent application Ser. No. 349,924. The combiner advantageously has flat outer surfaces 38 and 40 to reduce real world optical distortions which would result if the surfaces were curved. However, the combiner may have curved external surfaces. The hologram 32 may be formed in any suitable material such as in any of the gelatins typically used for making holograms and is constructed to have a low or substantially zero surface spatial frequency, i.e. wherein the fringe density intersecting the surfaces of the hologram is approximately two or fewer line pairs per millimeter. The hologram is constructed as set foth in the above-referenced application, for example employing a point source comprising a coherent light source such as a suitable laser. The hologram 32 is suitably a portion of a sphere, with the aforementioned point source disposed near the center of curvature so as to strike the hologram surface normal thereto forming fringes parallel or substantially parallel to the surfaces of the hologram rather than in intersecting relation to such surfaces. As a consequence, the combiner 12 is flare-free, and free of multiple images incurred when a high density of fringes intersects the surface of the hologram.

The symbology on the screen of cathode-ray-tube 20 is projected by relay optics 26 to form an intermediate image 54 which is reflected by second holographic optical element 28 toward combiner 12. The image surface 54 is located at one focal length away from the combiner. Combiner 12 forms a virtual image of the symbology so that the pilot sees the symbology superimposed on the real world scene at infinity.

Referring now to FIGS. 2 and 3, illustrating the optical portion of the present system in greater detail, screen 20a of the cathode-ray-tube is imaged by relay optics 26 at 54 to the left in FIG. 2 of holographic optical element 28, and this real image is then reflected by holographic optical element 28 toward hologram 32 for view by the pilot. The formation of the real image by relay optics 26 is known in the art and various combinations of individual lenses may be employed in the formation of such image. Because of the large off-axis angle 70 of holographic optical element 12, the relay optics 26 desirably forms a preaberrated image at 54, i.e. one that is first aberrated in a manner such that aberrations in an opposite sense by combiner 12 produces a nonaberrated presentation for view by the pilot. In accordance with the present invention, second holographic optical element 28 cooperates with relay optics 26 to bring this purpose about. The second holographic optical element has optical diffracting power effective in conjunction with the refractive power of the relay optical means for compensating optical aberrations caused by the large off-axis angle of the combiner. The relay lens means can alternatively be considered as providing a preaberrated image in compensation for the "net" aberrations produced by the combined first and second holographic optical elements which is, however, less than the aberrations as would be produced by element 32 alone.

Considering the relay optics in greater detail, this lens system suitably comprises conventional glass optical lenses 45–52 wherein lenses 46–51 form, in general, a double-gauss configuration, while the extreme lenses 45 and 52 minimize the angle of incidence relative to the relay lens system. As is known, the double gauss configuration in its canonical form includes two pair of meniscus-shaped lens elements, each pair being symmetrically mounted about a central stop. The double-gauss form is of advantage in taking an object to an image over a large field. The individual lenses in the particular example may be shaped and decentered as indicated in tables A and B. The decentering and angularity of the relay lens system relative to the central ray enables the proper imaging of cathode-ray-tube face 20a, required to be disposed at an angle, to provide an intermediate image suitable for further imaging in nonaberrated form by the combiner, without requiring disposition of the cathode-ray-tube face at too great an angle. Lens 49 includes a surface which is cylindrical in transverse cross-section for compensating astigmatism in the holographic optical system, e.g. across the aperture located proximate lens 49. This aperture is located such that the optics of the system re-image it at the design eye point or eye box.

Referring to table A, the surfaces a–w correspond in general to lettered surfaces in FIG. 2, where "a" corresponds to the eye of the pilot and surface "w" corresponds to the inside surface or phosphor layer of the cathode-ray-tube screen. In each instance, the radius of the surface is given and the shape of each surface is spherical except for surfaces b and d, v, and w which are flat, surface n which is cylindrical, and surface e which is complex and relates to holographic optical element 28, an example of which is hereinafter described. It is noted that b and d are the same surface. In Table A, there are two surface radii given for surface "n" because it is cylindrical and has, therefore, two meridians for which radii must be specified. A positive radius for a surface indicates the center of curvature is to the left in the drawing, and a negative radius indicates the center of curvature is to the right in the drawing (FIG. 2). In Table A, the distance of −6.2350 and decenter/tilt entry 8 of Table B are measured from the back (surface "u") to the front (surface "f") of the relay lens 26. The distance of 8.1437 and decenter/tilt entry 9 of Table B are measured from surface "f" to surface "v", which distance defines the spacing from surface "f" of lens 45 to surface "v" of the cathode ray tube 20. Dimensions are given in inches and the distance to the next surface is the axial distance to the next surface, where positive is to the left and negative is to the right in FIG. 2. Table A in fact specifies example dimensions for the entire system in accordance with the present invention, while table B further defines the decentering constants.

TABLE A

| SUR-FACE | SURFACE RADIUS | DISTANCE TO NEXT SURFACE | DECENTER/ TILT (SEE TABLE B) |
|---|---|---|---|
| a | (Pilot's eye) | 20.0 | 1 |
| b | Infinite | 0.9897 | — |
| c | −29.6157 | −0.9897 | 2 |
| d | Infinite | −7.000 | 3 |
| e | 80.3734 | 6.1309 | 4 |
| f | −19.8665 | 0.4641 | — |
| g | −9.7390 | 0.0976 | — |
| h | 8.2175 | 0.4688 | — |
| i | 3440.509 | 0.0200 | 5 |
| j | 3.3900 | 0.4204 | — |
| k | 5.8840 | 0.2756 | — |
| l | 4.1473 | 0.7792 | — |
| m | 2.2892 | 0.5795 | 6 |
| n | 8.3738, Infinite | 0.4000 | — |
| o | −6.0064 | 0.5182 | — |
| p | −1.3351 | 0.7000 | — |
| q | −1.9310 | 0.0200 | 7 |
| r | 21.9059 | 0.7500 | — |
| s | −4.5118 | 0.0200 | — |
| t | 3.9818 | 0.7500 | — |
| u | 30.9155 | −6.2350 | 8 |
| | — | 8.1437 | 9 |
| v | Infinite | 0.1970 | — |
| w | Infinite | (CRT) | — |

TABLE B

| DECENTER/TILT | DECENTER | TILT (Degrees) |
|---|---|---|
| 1 | 0.1087 | −27.0 |
| 2 | 0.1087 | −27.0 |
| 3 | 0 | +35.0 |
| 4 | 0.1471 | −11.1421 |
| 5 | −.5471 | 0 |
| 6 | 0.6001 | 0 |
| 7 | 0.250 | 0 |
| 8 | −.4473 | +11.1421 |
| 9 | −.5410 | +21.1413 |

A decenter/tilt defines a new coordinate system (displaced and/or rotated) in which subsequent surfaces are defined. Surfaces in table A following a decenter are aligned on the local mechanical axis or optic axis of the new coordinate system. The decenter and tilt measurements are made with respect to the vertex of each lens. The new mechanical axis remains in use until changed by another decenter.

The holographic optical element 28 is reflective in nature and provides further preaberration of the intermediate image 54 so as to compensate for the aberrations brought about by holographic optical element 12 due to the large off-axis angle. The characteristics of holographic optical element 28 are desirably closely matched to those of the relay lens system 26.

Figure 4:
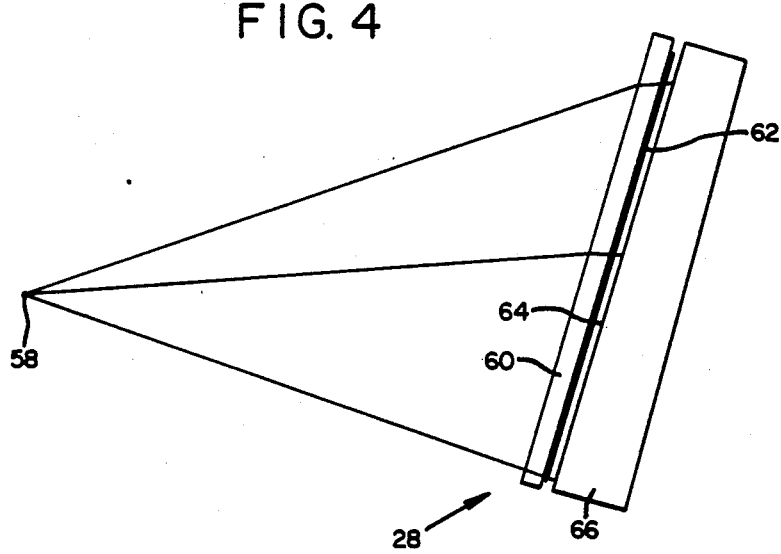

Referring to FIG. 4, holographic optical element 28 may be formed by a single-beam construction employing point source 58 or any other known techniques. The hologram 62 is provided on the rear surface of a glass plate 60 with the hologram being formed in any suitable material such as any one of the gelatins typically used for making holograms. For example, a conventional gelatin comprises one which is made from gelatin powder, USP by J. T. Baker Chemical Co. The gelatin is applied to the surface of glass plate 60 in any suitable way such as by dip coating. A typical material for the glass substrate 60 is crown glass, being optically finished, although plastic substrates can be utilized. The overall surface of the rear of the glass plate and hence the hologram is slightly curved, i.e. with the large radius indicated for surface e in table A, although the hologram base may have any appropriate curvature.

The holographic optical element 28 with the gelatin coating 62 is placed in an optical bench along with the point source 58 and suitable supporting rails or elements (not shown). The point source 58 preferably comprises a coherent light source such as a suitable laser.

Although a single beam is employed in construction of the hologram and is derived from point source 58, it will be appreciated that the hologram is formed as an interference pattern end consequently the beam from point source 58 is reflected to the gelatin surface 62 from a complex mirror surface 64 on glass plate 66. This complex mirror provides a phase function used to define the hologram, and is in the form of a sum of monomials in (X, Y), where the coordinates are on the surface of the substrate 66. These monomials are defined by way of example in table C. Thus, the power of holographic optical element 28 in the paticular example has the form of $K_1X^2 + K_2X^2Y + K_3Y^3 + K_4X^4 + \ldots$ wherein the constants, K are set forth in Table C. This mathematical expression for an aspheric holographic surface is formulated by known computer-aided design techniques and represents an overall optimized design for mirror surface 64 that has the desired optical properties which are not readily isolated to any one particular term in the expression.

TABLE C

| POWER OF | | COEFFICIENT, K |
|---|---|---|
| X | Y | |
| 2 | 0 | $-0.261799 \times 10^{-1}$ |
| 2 | 1 | $-0.841945 \times 10^{-2}$ |
| 0 | 3 | $-0.722234 \times 10^{-2}$ |
| 4 | 0 | $0.102580 \times 10^{-2}$ |
| 2 | 2 | $0.102750 \times 10^{-2}$ |
| 0 | 4 | $-0.648001 \times 10^{-4}$ |
| 4 | 1 | $0.178268 \times 10^{-3}$ |
| 2 | 3 | $0.462778 \times 10^{-3}$ |
| 0 | 5 | $0.171508 \times 10^{-3}$ |

The phase function as specified in table C is used in conjunction with the point source to define the hologram.

The wavelength for point source 58 in the particular example was 549 nm. The radius of the substrate 60 was 80.3734 inches and the hologram is defined as a thick reflection hologram having a thickness of 25 microns.

The numerical design data indicated above is, as indicated, by way of example only. The exact form of the holographic optical element 28 in a given instance is most easily determined by ray tracing wherein the ray pattern from the relay lens system and desired ray pattern for the combiner are matched or intersected, and the holographic optical element 28 is formed accordingly. The ray traces that are typical of this kind of optical construction are illustrated in FIGS. 2 and 3 wherein the full line traces are in the plane of the drawing and the dashed line traces are out of the plane of the drawing. The ray tracing method of construction is most suitably conducted by means of a digital computer in a known manner.

Although a holographic optical element 28 is preferred, particularly in respect to ease of duplication of the complex surface involved, a non-holographic reflecting element having the same characteristics could be substituted therefor.

As can be seen, the combiner according to the present invention is simplified according to the head up display of the present invention so as to avoid see-through flare since the complexities relating to aberration correction are placed in holographic optical element 28 instead. Although the combiner has a low surface spatial frequency for reducing flare, the holographic optical element 28 need not have a low surface spatial frequency inasmuch as it is out of the pilot's line of sight. Consequently, as much correction can be built into holographic optical element 28 as desired for achieving a nonaberrated display. The extent of optical correction provided in the holographic optical element 28 on the one hand and in the relay lens system on the other can be altered while still providing overall compensation for the combiner. The holographic optical element 28 is generally designed to provide aberration correction (or preaberration compensating for the aberration of element 32) across the field of view, and the relay lens system is generally designed to provide aberration correction (or preaberration compensating for the aberration of element 32) across the aperture or the allowable transverse movement of the pilot's eyes.

Although a holographic combiner is preferred because of its much superior efficiency, a non-holographic combiner may in some instances be substituted.

While I have shown and described a preferred embodiment of my invention, it will be apparent to those skilled in the art that many changes and modifications may be made without departing from my invention in its broader aspects. I therefore intend the appended claims to cover all such changes and modifications that fall within the true spirit and scope of my invention.

I claim:

1. A system for providing an essentially flare-free head up display, comprising:
   a first holographic optical element functioning as a combiner through which an exterior view may be seen by an observer,
   a visual information source,
   lens means for forming an intermediate image of said information source,
   and a second holographic optical element located out of the observer's direct line of sight and positioned for reflecting the light which forms said intermediate image toward said first holographic optical element at an off-axis angle relative to said first holographic optical element to permit further imaging of said intermediate image at infinity by said first holographic optical element, said second holographic optical element having optical aberrating properties of a reverse sense to those of the first holographic optical element for compensating aberrating properties of said first holographic optical element causing said first holographic optical element to provide a high quality virtual image at infinity in response to said intermediate image,
   said first holographic optical element having a curved shape and a surface spatial frequency of approximately two or fewer line pairs per millimeter for reducing flare from bright objects viewed through said first holographic optical element.

2. The system according to claim 1 wherein said lens means is constructed to provide a preaberrated first image in compensation for net aberrations produced by the combined first and second holographic optical elements.

3. A system for providing an essentially flare-free head up display, comprising:
   a holographic optical element functioning as a combiner through which the observer can see an exterior view, said holographic optical element having a curved shaped and a surface spatial frequency of approximately two or fewer line pairs per millimeter for reducing flare from bright objects,
   a visual information source,
   lens means for directing light from said source in a predetermined direction,
   and wavelength selective means out of the observer's direct view for reflecting light received from said lens means towards said holographic optical element at an off-axis angle for providing an image of said information for view by said observer,
   said wavelength selective means having optical light-directing properties cooperating with those of said lens means for correcting optical aberrations caused by said off-axis angle.

4. A system for providing an essentially flare-free head up display, comprising:
   a first holographic optical element functioning as a combiner through which the observer sees an exterior view,
   symbology forming means for providing information for visual presentation to the observer by way of said first holographic optical element,
   relay optical means for forming an image of symbology from said symbology forming means at a predetermined location,
   and a second holographic optical element positioned out of the observer's direct line of sight for reflecting the light which forms said image toward said first holographic optical element at an off-axis angle for further imaging of said symbology at infinity by said first holographic optical element,
   said second holographic optical element having optical diffracting power effective in conjunction with the refractive power of said relay optical means for compensating optical aberrations caused by said off-axis angle,
   said first holographic optical element having a curved shape and a surface spatial frequency of approximately two or fewer line pairs per millimeter for reducing flare from bright objects while said second holographic optical element has a higher surface spatial frequency.

5. The system according to claim 4 wherein said symbology forming means comprises a cathode-ray tube.

6. The system according to claim 4 wherein said system is located in an aircraft for providing said display for the aircraft pilot, and wherein said symbology forming means and said relay optical means are located substantially forward of the pilot's position in the aircraft, underneath the pilot's direct line of sight through said first holographic optical element.

7. The system according to claim 6 wherein said second holographic optical element is located below said direct line of sight between the pilot's position and said relay optical means.

8. A system for providing a head up display comprising:
an optical combiner that includes a first holographic optical element through which the observer can see an exterior view, said first holographic optical element having a curved shape and a surface spatial frequency of approximately two or fewer line pairs per millimeter,
a visual information source,
lens means for directing light from said source in a predetermined direction,
and wavelength selective means out of the observer's direct exterior view for reflecting light received from said lens means toward said combiner at an off-axis angle for providing an image of said information for view by said observer,
said wavelength selective means having optical light-directing properties cooperating with those of said lens means for correcting aberrations caused by said off-axis angle.

9. The system according to claim 8 wherein said wavelength selective means comprises a second holographic optical element.

10. The system according to claim 8 wherein said system is located in an aircraft for providing said display for the aircraft pilot, and wherein said visual information source and lens means are located substantially forward of the pilot's position in the aircraft, underneath the pilot's direct line of sight through said optical combiner.

11. The system according to claim 10 wherein said wavelength selective means is located below said direct line of sight between the pilot's position and said lens means.

* * * * *